United States Patent Office 2,713,046
Patented July 12, 1955

2,713,046

FLUORESCENT AGENTS

William Wilson Williams and Harlan Benjamin Freyermuth, Easton, Pa., assignors to General Aniline & Film Corporation, New York, N. Y., a corporation of Delaware No Drawing. Application October 9, 1951,
Serial No. 250,572

4 Claims. (Cl. 260—247.1)

This invention relates to novel fluorescent agents of the triazinylstilbene series containing a lower aliphatic ether group which have been found to be of particular value as optical bleaching agents especially for incorporation in soaps and other detergents.

The novel fluorescent agents of the present invention may be represented by the following general formula:

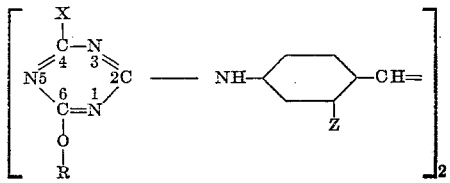

Formula I wherein R represents lower alkyl (e. g. residue of methanol, ethanol, isopropanol, Cellosolve, Carbitol, 2-phenylethanol and the like), lower alkenyl (e. g. residue of allyl alcohol, methallylalcohol, 2-chloroallyl alcohol and the like) and lower alkynyl (e. g. residue of propargyl alcohol). X represents OR or —NH$_2$ or the residue of a primary or secondary amine, for instance, alkylamine or substituted alkylamine such as CH$_3$NH—, (CH$_3$)$_2$N—, C$_2$H$_5$NH—, (C$_2$H$_5$)$_2$N—, (CH$_3$)$_2$CHNR—, $n$=C$_4$H$_9$NH—, sec. C$_4$H$_9$NH—, +C$_{12}$H$_{25}$NH—

HOCH$_2$CH$_2$NH—, —NHCH$_2$OH, etc., arylamino such as

C$_6$H$_5$NH—, ClC$_6$H$_4$NH—, CH$_3$C$_6$H$_4$NH—

CH$_3$OC$_6$H$_4$NH—, CF$_3$C$_6$H$_4$NH—, C$_{10}$H$_7$NH—

(naphthylamino), C$_{14}$H$_9$NH— (anthrylamino)

HO$_3$SC$_6$H$_4$NH—, (CH$_3$)$_2$C$_6$H$_3$NH—, etc., heterocyclic such as

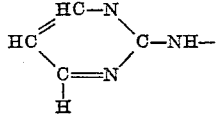

aminothiazole, aminobenzothiazole, aminotetrazole, etc. alicyclic such as cyclohexylamine, tetrahydronaphthylamine, etc. X may also be a cyclic amine such as pyrimidine, pyrrolidine, piperidine, morpholine and thiomorpholine. Z represents the group —COOM or —SO$_3$M in which M represents hydrogen or a cation, usually alkali metal (i. e. sodium or potassium) or ammonium, alkylol amine, etc., or alkaline earth metal such as barium or calcium.

These novel compounds are readily prepared by condensing a 4,4'-diaminostilbene sulfonic or carboxylic acid with cyanuric chloride (or cyanuric bromide, if preferred), two molecular proportions of cyanuric halide being employed for each molecular proportion of the 4,4'-diaminostilbene acid.

As the 4,4'-diaminostilbene acid employed in this primary condensation, there is preferably used 4,4'-diamino-2,2'-stilbene disulfonic acid. This material is commercially valuable and the novel products derived therefrom are strong fluorescers. However, other 4,4'-diaminostilbene acids such as 4,4'-diamino-3,3'-stilbene disulfonic acids; 4,4'-diamino-2,2', 6,6'-stilbene tetrasulfonic acid, may be used, if desired, and valuable products may also be obtained by the use of 4,4'-diamino-stilbene carboxylic acids such as 4,4'-diamino-2,2'-stilbene dicarboxylic acid or 4,4'-diamino-3,3'-stilbenedicarboxylic acid although in general the derivatives of the diaminostilbenecarboxylic acids fluoresce somewhat weakly than the corresponding derivatives of the sulfonic acids.

By the condensation of a 4,4'-diaminostilbene acid with cyanuric chloride there is obtained as a primary condensation product the triazyl derivative of the acid. This primary condensation product is then further condensed with two molecular proportions of an aliphatic alcohol such as preferably a lower alkanol, such as ethanol, methanol, isopropanol, etc. and two molecular proportions of primary or secondary amine. The condensation of the triazyl derivative of the diaminostilbene acid with the alcohol and the ammonia or amine may be carried out in any order advantageously. However, the triazyl derivative may be condensed with an aliphatic alcohol whereby there is obtained a novel intermediate product having the formula:

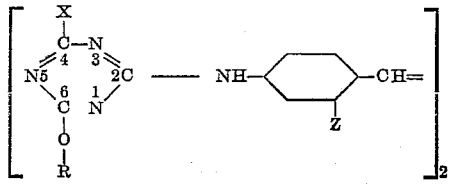

Formula II wherein X stands for chlorine or bromine and R and Z are as defined above.

This novel intermediate product is then finally condensed with ammonia, an alcohol or a primary or secondary amine in order to obtain the novel products of the present invention.

These condensations may be carried out by procedures commonly employed in the art for effecting such condensations. In order to illustrate fully the preparation of compounds of the present invention the following detailed illustrations of the preparation of the novel intermediate of the present invention and of specific fluorescent agents embodied therein are given. The parts are by weight.

EXAMPLE I

Preparation of intermediate

Thirty-seven parts of cyanuric chloride are dissolved in 120 parts of acetone and poured into a mixture of ice and water. During the suspension in ice water, the temperature of the aqueous suspension should not rise above 5° C. Thirty-seven parts of 4,4'-diamino-2,2'-stilbenedisulfonic acid are dissolved in 150 parts of water with the addition of enough sodium carbonate to give a neutral solution. This solution is added slowly to the cyanuric chloride suspension and at the same time a solution of sodium carbonate is added in order to keep the mixture from becoming too acid. The temperature should not rise above 5° C. during this condensation. The condensation is complete when a sample of the reaction mixture which has been acidified and treated with sodium nitrite does not develop color when treated with an alkaline solution of R salt. When the condensation is complete, the product is filtered and the wet press cake is stirred at room temperature for 8 hours with 475 parts methanol, 8 parts sodium hydroxide.

There is thus obtained the novel intermediate product of Formula II above wherein X is chlorine and R is methyl. By replacing the methanol with an equivalent amount of ethanol there may be obtained an ethanolic solution of novel intermediate product of Formula II above wherein X is chlorine and R is ethyl. Likewise by replacing the methanol with an equivalent amount of isopropanol there may be obtained a propanolic solution of novel intermediate of Formula II above wherein X is chlorine and R is isopropyl.

EXAMPLE II

A novel fluorescent agent of the present invention was then produced from the methanolic solution from the novel intermediate obtained as described in paragraph 1 of Example I as follows:

To the methanolic solution of the intermediate (without isolation or other purification of the product), obtained as described in Example I, first paragraph, there was added 800 parts of water and 28 parts of morpholine. The pH is adjusted to 9.5 by the addition of sodium carbonate solution and the mixture then heated to 80–90° C. for four hours and then cooled and the product isolated by filtration and drying at 70–75° C. There is thus obtained a compound corresponding to the formula:

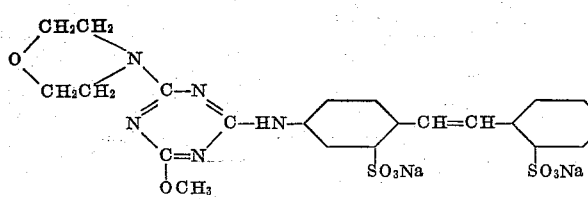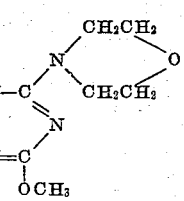

By treating the novel intermediates (obtained as described in paragraph 2 of Example I) in the manner described in the preceding paragraph there are obtained compounds of similar properties wherein the methyl group of the compound illustrated immediately above is replaced by ethyl and isopropyl groups, respectively.

EXAMPLE III

The novel intermediate product obtained as described in paragraph 1 of Example I is treated (without isolation or purification of the material obtained) by adding thereto 800 parts of water and 24.6 parts of 4-anisidine. The pH is adjusted to 9–9.5 by the addition of sodium carbonate solution and the mixture is heated to 80–90° C. for four hours. It is then cooled, the product recovered by filtration and dried at from 70–75° C. There is then obtained a compound corresponding to the formula—

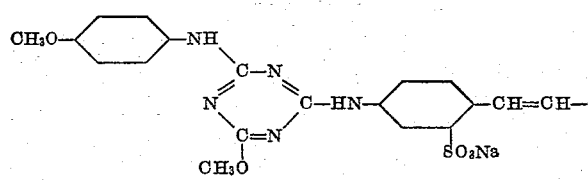

EXAMPLE IV 36.2 parts of 2-methoxyl-4,6-dichloro-1,3,5-triazine (prepared by the reaction of aqueous methanol on cyanuric chloride in the presence of sodium bicarbonate) is dissolved in 120 parts acetone and this solution is poured into a mixture of ice and water. Thirty-seven parts of 4,4'-diamino-2,2'-stilbenedisulfonic acid are dissolved in 150 parts of water with the addition of enough sodium carbonate solution to give a neutral solution. This solution is added to the triazine suspension and a solution of 160 parts anhydrous sodium acetate and 400 parts water are added. The mixture is allowed to warm to room temperature and is stirred for 24 hours. When the condensation is complete, resulting in the formation of the novel intermediate product of Formula I above wherein X is chlorine and R is methyl, there is added 28 parts of morpholine and the pH is adjusted to 8–9 by the addition of a solution of sodium carbonate. The mixture is heated to 80–90° C. for 6 hours. After cooling the mixture is isolated in the usual manner. The product obtained by this procedure is identical with the material described in Example II.

EXAMPLE V

The procedure of Example IV is followed except 24.6 parts 4-anisidine is used in place of 28 parts of morpholine. There is obtained by this method a product which is identical to the one described in Example III.

EXAMPLE VI

Thirty-seven parts of cyanuric chloride are dissolved in 120 parts of acetone and poured into a mixture of ice and water. During the suspension in ice water, the temperature of the aqueous suspension should not rise above 5° C. Thirty-seven parts of 4,4'-diamino-2,2'-stilbenedisulfonic acid are dissolved in 150 parts of water with the addition of enough sodium carbonate to give a neutral solution. This solution is added slowly to the cyanuric chloride suspension and at the same time a solution of sodium carbonate is added to keep the mixture from becoming too acid. The temperature should not rise above 5° C. during this condensation. The condensation is complete when a sample of the reaction mixture which has been acidified and treated with sodium nitrite does not develop a color when treated with an alkaline solution of R salt. The solid material is removed by filtration and the wet filter cake is slurried with a mixture of 16 parts of sodium hydroxide and 675 parts of methanol which previously has been cooled to 0° C. The mixture is stirred at 0° C. for ten minutes, at room temperature for thirty minutes and at reflux temperature for thirty minutes. The slurry is allowed to cool to room temperature and is isolated in the usual manner. The product corresponds to the following structure:

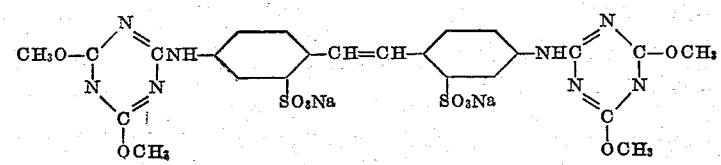

EXAMPLE VII 37 parts of cyanuric chloride are dissolved in 120 parts of acetone and poured into a mixture of ice and water. During the suspension in the ice water the temperature of the aqueous suspension should not rise above 5° C. 37 parts of 4,4'-diamino-2,2'-stilbenedisulfonic acid are dissolved in 150 parts of water with the addition of enough sodium carbonate to give a neutral solution. This solution is then added slowly to the cyanuric chloride suspension in ice water and at the same time a solution of sodium carbonate is slowly added in order to keep the mixture from becoming too acid (pH of 3 to 3.5). During this addition and consequent condensation the temperature should not rise above 5° C. The condensation of the cyanuric chloride with the diaminostilbene disulfonic acid is complete when a sample of the reaction mixture which has been acidified and treated with sodium nitrite does not develop color when treated with an alkaline solution of "R" salt.

When this condensation is complete 17.4 parts of morpholine is added to the thus obtained product and immediately afterwards a solution of 160 parts of anhydrous sodium acetate in 400 parts of water is added. The thus obtained mixture is allowed to warm to room temperature and may be heated to 35 to 40° C. if necessary to complete the condensation. The product is filtered and the wet press cake is stirred at room temperature for 8 hours with 475 parts of methanol and 16 parts of sodium hydroxide. The mixture is refluxed for 3 hours and is then cooled, filtered and the product dried at 70–75° C. There is thus obtained a compound identical to that described in Example II.

EXAMPLE VIII

The procedure of Example VII is followed except that 24.6 g. of 4-anisidine are used in place of 17.4 parts morpholine. There is obtained a compound identical to that described in Example III.

The foregoing materials were tested by incorporating a small amount thereof in soaps and synthetic detergents (i. e., about 0.1 per cent by weight, 0.025 per cent and 0.5 per cent by weight of the fluorescent agents) in a commercial sodium soap of fatty acids (Lux Flakes) and in a synthetic detergent comprising essentially a mixture of sodium alkylaryl sulfonate and sodium phosphates (Tide) and the thus obtained detergent mixtures employed to wash cellulosic (cotton, rayon), wool and nylon fabrics. White materials thus washed were extraordinarily whiter in appearance and colored materials brighter than similar materials which were washed using ordinary soaps or detergents which contained no fluorescent agents. The above materials were also incorporated in discharge pastes and applied to fabrics in the usual manner. Whites thus treated were unusually whiter than those treated using similar discharge pastes containing no fluorescent agents. The novel agents of this invention were applied to cellulosic, wool and nylon fabrics from weakly alkaline baths whereby the white appearance of the fabric was much improved.

It will be apparent that in the foregoing examples the novel products of the present invention were obtained in the form of their sodium salts. However, the potassium salts have substantially similar properties and it will be apparent that the potassium salts will be obtained by using potassium carbonate and acetate in place of sodium carbonate and acetate as the alkaline agents for the condensations in the synthesis of these materials. The free acids may be obtained by acidification of the sodium or potassium salt while other salts such as the ammonium or alkylol amine salts may be obtained by neutralization of the free acids. Where spirit soluble products are desired, for instance, in brightening of lacquers etc. the higher alkyl or cycloalkylamine salts of the free acids such as the cyclohexylamine salts of the free acids may be produced by methods known in the art. The alkaline earth metal salts such as the barium and calcium salts which may be obtained from the free acid or by double decomposition of the sodium or potassium salts have been found to be useful for the brightening of photographic prints, etc.

In addition to the compounds described specifically above, a wide variety of valuable fluorescent agents of Formula I above may be obtained by replacing the morpholine or 4-anisidine used in the examples with other amines. We particularly prefer the compounds obtained by employing as the amine, diethanol amine or alkyl and alkoxy substituted anilines such as 2,4-dimethoxy aniline, 3,5-dimethoxy aniline, 2-methoxy toluidine, ortho and meta anisidines, xylidine and the like.

As valuable amines which may be employed to produce valuable fluorescent agents of Formula I above in which the group X will correspond to the amino radical of the particular amine employed may be mentioned primary alkylamines such as methyl-, methylol, ethyl-, ethylol, propyl-, isopropyl-, n.-sec.- or tert.-, butyl-, dodecyl-, or stearyl-amino etc.; primary arylamines such as chloro anilines, toluidines, anisidines, xylidines, naphthylamines, anthrylamine, sulfanilic acid, 3-amino phenol etc., also heterocyclic amines such as 2-aminothiazole, 2-aminobenzothiazole, 2-amino pyrimidine etc., also cycloalkylamines such as cyclohexyl amine, tetrahydronaphthyl amine, etc., also alkarylamines such as benzylamine etc. As example of secondary amines which may be used may be mentioned the secondary amines corresponding to any of the above primary amines in which an amino hydrogen has been replaced by an alkyl, aryl, or heterocyclic group, for instance dialkylamines such as dimethyl-, diethyl, methyl-ethyl-, dibutyl-, diamyl-, methyl-butyl-, methylcyclohexylamines, also N-alkyl, aryl amines such as N-methyl-, N-ethyl-, or N-butylanilines, -anisidines, -naphthylamines, -aminothiazoles, -aminopyridines etc., also such heterocyclic secondary amines as carbazole, thiomorpholino, pyrrole, pyrrolidino, indole, etc.

The novel fluorescent agents of the present invention fluoresce under ultra-violet light with a bluish fluorescence, and since they are substantive to cellulosic materials, are particularly valuable for incorporation into soaps and synthetic detergents such as alkyl aryl sulfonates, higher fatty acid methyl taurides, non-ionic detergents such as the polyglycol ethers of alkyl phenols or of partial higher fatty acid esters of mannitol or sorbitol. The fabrics washed with formulations of detergents containing these fluorescent agents appear much whiter in the case of whites and much brighter in the case of colors than fabrics which are washed with ordinary soaps or detergents. These fluorescent agents may also be applied to fabrics by separate treating baths and similar methods and procedures well known in the art. They are also useful when incorporated into paper or other wrapping materials, particularly cellulosic wrapping material to improve the whiteness of such material, as well as to protect the contents from the action of ultra-violet light. They may also be incorporated in discharge pastes whereby the whites obtained upon discharge are decidedly whiter than those discharges made in the absence of such materials. They may also be used to bleach fabrics and in such cases the amount of bleach necessary is materially reduced and one or more steps of the normal bleaching operations may be eliminated.

We claim:

1. Fluorescent agents selected from the group consisting of compounds of the formula:

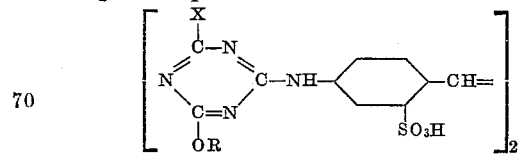

wherein R represents lower alkyl and X represents a member of the group consisting of morpholino, anisidino and methoxy, and the salts of said compounds.

2. Fluorescent agents which in the form of the free acid have the formula

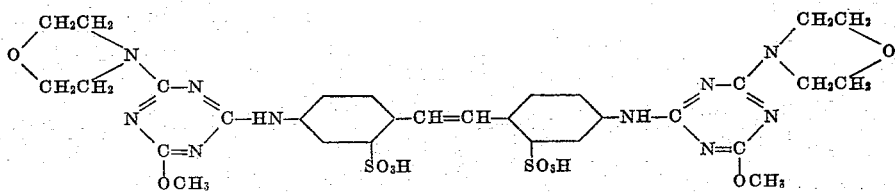

3. Fluorescent agents which in the form of the free acid have the formula

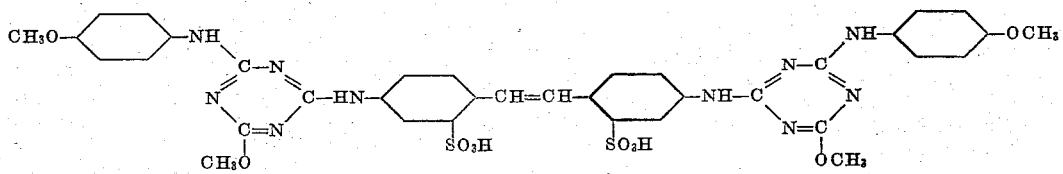

4. Fluorescent agents which in the form of the free acid have the formula

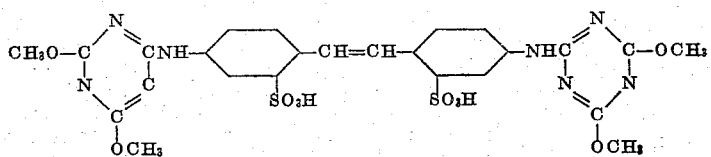

References Cited in the file of this patent

UNITED STATES PATENTS

| | | |
|---|---|---|
| 2,368,844 | Keller | Feb. 6, 1945 |
| 2,376,743 | Wendt | May 22, 1945 |

FOREIGN PATENTS

| | | |
|---|---|---|
| 498,678 | Belgium | Apr. 13, 1951 |

OTHER REFERENCES

Serial No. 381,856, Wendt (A. P. C.), published May 11, 1943.